Oct. 23, 1951    R. T. ANDERSON    2,572,236
DRAIN PAN
Filed Aug. 25, 1947
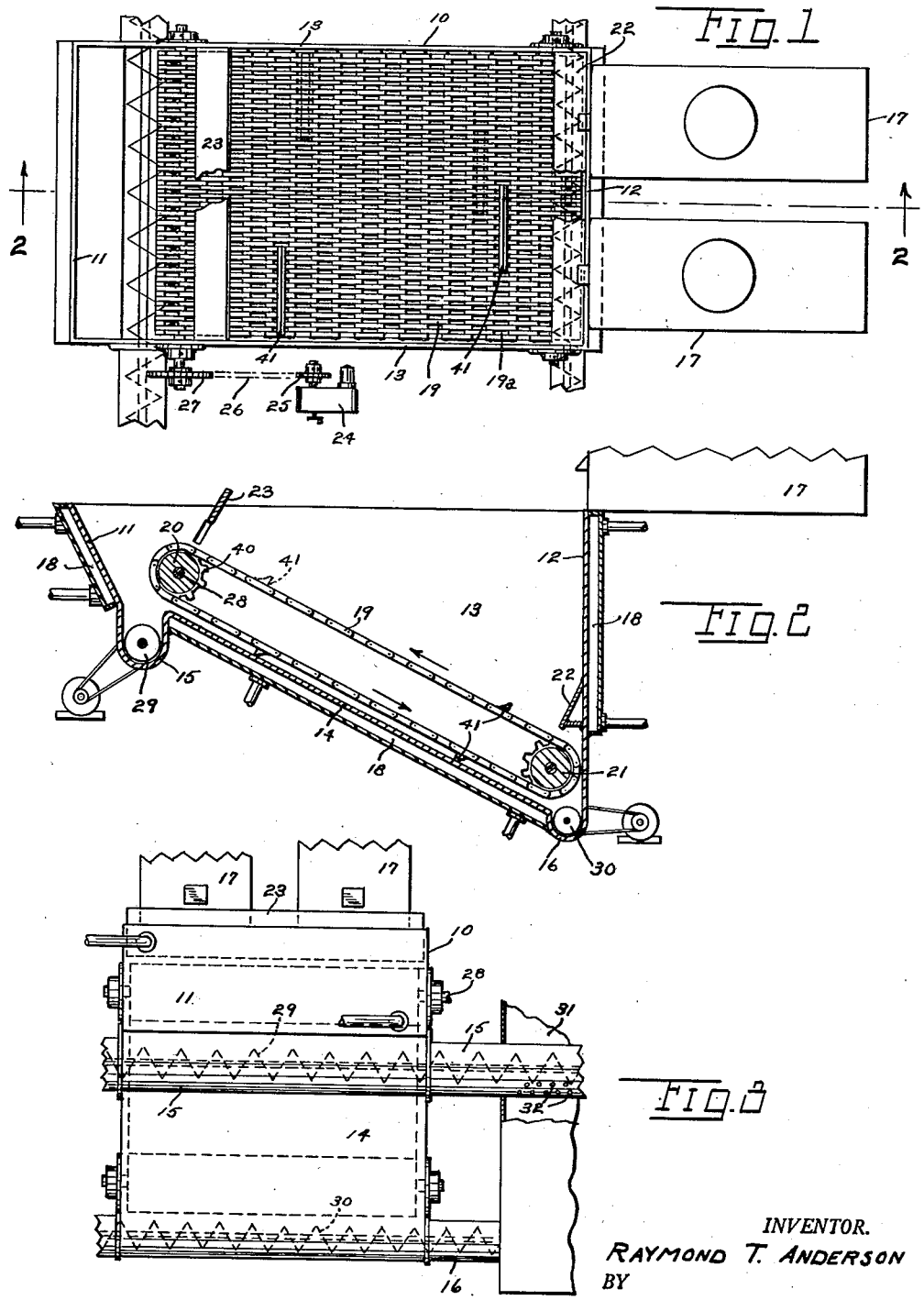
INVENTOR.
RAYMOND T. ANDERSON
BY
Hyde, Meyer, Baldwin & Doran
ATTORNEYS Patented Oct. 23, 1951

2,572,236

UNITED STATES PATENT OFFICE 2,572,236

DRAIN PAN

Raymond Tuttle Anderson, Lakewood, Ohio, assignor to The V. D. Anderson Company, Cleveland, Ohio, a corporation of Ohio Application August 25, 1947, Serial No. 770,536

2 Claims. (Cl. 210—175)

This invention relates to drain pans such as are used to drain melted fat from cooked cracklings.

One object of the invention is to provide an improved moving screen self-cleaning drain pan which is continuous in operation, which is of simple form and yet highly efficient, and which requires very little service or attention on the part of the operator.

Another object is to provide an improved drain pan which increases the recovery of fat or tallow without sacrifice in rate of production.

Still another object is to provide an improved drain pan including a movable endless belt, chain, or grate which serves first as a strainer or filter for separating the liquid and fine from the coarse material, second as a conveyor to conduct the coarse material to its outlet, and third as an automatic cleaner for the bottom of the tank or receptacle in which it operates.

A further object is to provide an improved drain pan which insures steady and continued supply of a uniform or even stream of solid material, thus avoiding fluctuations and consequent overload on following pieces of apparatus.

Further objects of the invention in part are obvious and in part will appear more in detail hereinafter.

In the drawings, Fig. 1 represents a plan view of one form of apparatus embodying the invention;

Fig. 2 is a sectional elevation on the line 2—2, Fig. 1; and

Fig. 3 is a front elevation, the view being taken from the left in Fig. 1.

The present invention relates to drain pans for continuously separating liquids from solids of any kind, but has more particular relation to the separation of melted fat and fine solid material from the coarser material in a mass of heated or cooked cracklings resulting from the cooking of meat residues in packing houses and the like. One complete system for that sort of work is shown and described in a prior application for Process and Apparatus for Handling Cracklings, Serial Number 694,134, filed August 30, 1946, jointly by me and Carl W. Zies and Frederick W. Weigel, to which reference may be had if desirable or necessary. In fact the drain pan of this invention is an improvement upon and may be used as a substitute for the one shown and described in said application, its general purposes and manner of operation being the same.

As here illustrated, the drain pan comprises a sheet metal tank or receptacle, marked generally 10, having front and rear walls 11, 12, end walls 13 of generally triangular form and a floor or bottom 14 sloping from front to rear, the metal of the floor along its higher edge (the front) being shaped to form a trough or conductor 15, and along its lower edge to form a trough or conductor 16, both of semicylindrical form. This tank is mounted upon a suitable support or frame (not shown) in front of one or a battery of several (two being shown) of cookers 17, shown conventionally, the product outlets of which are just above the deep portion of the tank chamber so that the cooked material is discharged directly into the tank from the cookers. The tank top, of course is open, although a removable cover (not shown) may be employed, if desired.

If desired, the walls and floor of the tank, or some of them, may be made of spaced plates, to provide a jacket space 18 through which heating steam may be circulated to keep the contents hot during fat separation.

The tank floor is almost entirely covered by an endless belt, chain or conveyor, shown conventionally and marked generally 19. This is a wide belt, mounted and traveling around elongated pulleys or rollers 20, 21. Roller 21 is down in the low angle of the tank cavity, above trough 16, while the other roller 20 is at the front near the top of the tank, overhanging the trough 15. An inclined deflector or shield 22 prevents coarse material from dropping down past the belt into trough 16, while a vertically adjustable sliding dam 23 is provided to smooth off the mass of upwardly moving solid material and discharge it over roller 20 in a layer of uniform thickness.

Belt 19 may be made of any suitable material and in any desired form. It may consist of roller chain links pinned together, or may be made of elongated links, slotted, like the chain grate of a boiler stoker. In any case it will be foraminous having openings indicated conventionally at 19a, Fig. 1, by means of which it serves as a screen holding back the coarse solid material, but permitting liquid material, such as melted fat, tallow, and fine foots, to pass through both the stretches of the chain to the tank floor along which it flows or is carried to the fine—or bottom—trough 16.

The belt also serves as a conveyor for both liquid and solid material. It travels counterclockwise or in the direction of the arrows, Fig. 2, being driven slowly, at any desirable uniform speed, by any suitable means, such as variable speed motor 24, which drives a sprocket 25 connected by chain 26 to a sprocket 27 on a portion of the shaft 28 of roller 20 which extends out through the tank end wall. Upward travel of the upper stretch of the belt carried the coarse solid material, which does not pass through the belt as a screen, upwardly to and discharges it over roller 20 into the upper trough 15. Any fine solid material which passes through the upper stretch of belt, as well as melted fat or liquid, which clings to the lower stretch of belt is carried downwardly toward the lower trough 16 and probably drops off from the chain and finds its way to that trough.

The belt also serves as a cleaner for the tank bottom or floor, because its lower stretch travels close to the floor and, since it hangs down from the rollers 20, 21 a little slack in the belt causes it to drag or scrape along the floor and automatically scrape off and carry along any deposit of solid material that otherwise might tend to collect, harden and cake there.

Within the two troughs 15, 16 are mounted screw conveyors marked respectively 29, 30, their purpose being to advance the material deposited in the troughs to suitable discharge outlets or to following apparatus, as in said prior application. Conveyor 30 and trough 16, for example, which handle the liquid fat and fine material may discharge directly into a suitable settling tank 31, while conveyor 29 and trough 15 may extend beyond the settling tank to conduct the solid material to a hammer mill or other piece of apparatus, such as a screw press. In that case that portion of the trough extending over the settling tank is perforated to form a screen 32 through which any remaining liquid drains into the settling tank.

Usually, to insure positive traction for the conveyor belt 19, the driving roller 20, therefore, may be provided at several points along its length, opposite different zones of the belt, with sprocket teeth 40, though this is not always necessary. Also, said belt may be provided with a few projections 41, in blade form, which are distributed at suitable intervals along its length and overlap each other endwise. These not only serve to assist in carrying the heavy load of solid material upwardly over the tank bottom, but also scrape the bottom as they travel downwardly along it, thus cleaning the bottom and preventing the collection of deposits upon it.

The apparatus described is simple and highly efficient. It serves not only to separate liquid from solid material, but is also self-cleaning and automatically operative as a feeder for the material being handled, conducting it to the outlet in a uniform stream and thus enabling the system of which the device forms a part to operate continuously.

Other advantages of the invention will be apparent to those skilled in the art.

What I claim is:

1. A drain pan for handling cracklings in the separation of liquids therefrom, comprising a receptacle having side walls and end walls, a bottom wall lying in an inclined plane between said end walls, the upper and lower ends of said bottom wall having transverse portions recessed below the plane of the bottom to form respective upper and lower troughs, one of the side walls being provided with upper and lower discharge openings registered respectively with said upper and lower troughs, an endless foraminous belt supported within said receptacle and having upper and lower flights, the lower flight extending generally parallel to said bottom wall and disposed to scrape said bottom wall in the direction of said lower trough during belt movement, the upper flight being adapted to travel in an upwardly inclined direction to carry material supportable thereon towards and into said upper trough, screw flight means in each said trough each such screw flight means having a portion thereof extending through the aforesaid respective discharge opening in the side wall, upper dam means extending transversely across said receptacle above said upper flight near said upper trough and vertically spaced from said upper flight a predetermined distance to permit passage thereunder of a layer of material of predetermined thickness, and lower dam means extending transversely across said receptacle immediately above the lower end of said upper flight above said lower trough, whereby to prevent dropping of oversized pieces of material into said lower trough.

2. Apparatus as defined in claim 1 wherein said endless belt is provided with scraper projections extending outwardly away from said belt whereby to assist in moving material in the direction of belt travel.

RAYMOND TUTTLE ANDERSON.

REFERENCES CITED

The following references are of record in the file of this patent:

UNITED STATES PATENTS

| Number | Name | Date |
| --- | --- | --- |
| 1,151,956 | Lea | Aug. 31, 1915 |
| 1,317,557 | Davis | Sept. 30, 1919 |
| 1,404,873 | McGee | Jan. 31, 1922 |
| 1,629,701 | Hass | May 24, 1927 |
| 1,789,425 | Cabrera | Jan. 20, 1931 |
| 1,845,893 | Sommermeyer | Feb. 16, 1932 |
| 2,327,226 | Taylor | Aug. 17, 1943 |
| 2,350,096 | Chilton | May 30, 1944 |
| 2,378,798 | Schneible | June 19, 1945 |

FOREIGN PATENTS

| Number | Country | Date |
| --- | --- | --- |
| 183,430 | Great Britain | Mar. 22, 1943 |